March 21, 1944.   D. C. BARDWELL   2,344,929
PROCESS FOR THE PRODUCTION OF SALTS
Filed March 9, 1934
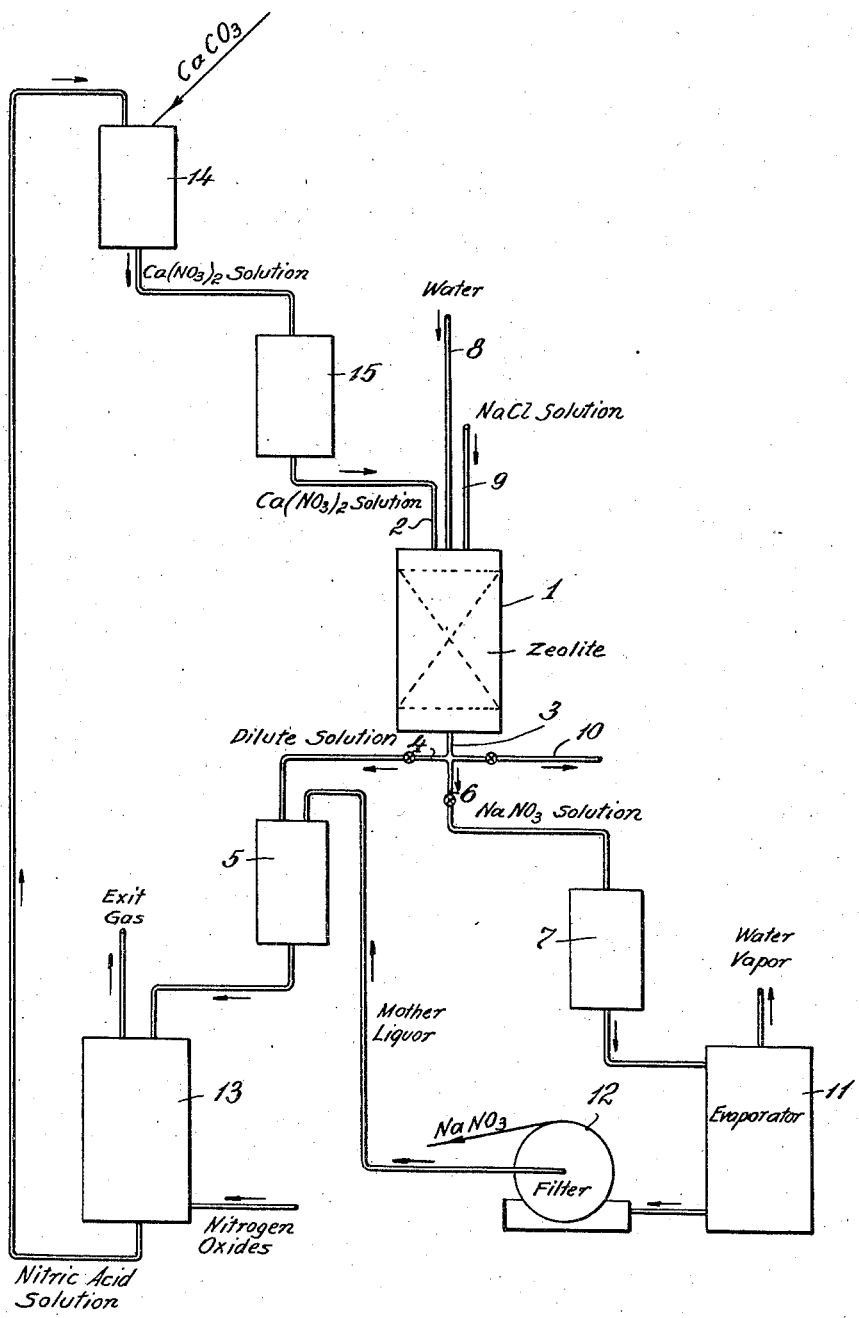
INVENTOR
Dwight C. Bardwell
BY
ATTORNEY Patented Mar. 21, 1944

2,344,929

UNITED STATES PATENT OFFICE 2,344,929

PROCESS FOR THE PRODUCTION OF SALTS

Dwight C. Bardwell, Syracuse, N. Y., assignor, by mesne assignments, to The Solvay Process Company, New York, N. Y., a corporation of New York Application March 9, 1934, Serial No. 714,846

7 Claims. (Cl. 23—102)

This invention relates to a process for the production of sodium, potassium or ammonium salts from the corresponding salt of a different basic radical such as, for example, water soluble salts of calcium or magnesium. More particularly, this invention relates to the production of sodium, potassium or ammonium nitrate from calcium or magnesium nitrate by an exchange of the basic radicals of the salts through the intermediary of a zeolite.

The present application is a continuation in part of my copending United States patent application Serial No. 660,437, filed March 11, 1933.

It has heretofore been known to reduce the hardness of water containing calcium bicarbonate in the low concentrations in which it is found dissolved in water, by passing the water through a bed of a solid sodium zeolite. These sodium zeolites have the approximate general formula of $Na_2O.xAl_2O_3.ySiO_2.zH_2O$. The sodium radical in the zeolite has the property of being exchangeable for the calcium radical in the calcium bicarbonate, which reaction is shown by the following equation for one example of a sodium zeolite:

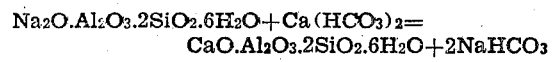

Both the sodium zeolite and the calcium zeolite formed by replacement of the sodium radical by the calcium are relatively insoluble solids so that in passing water through the zeolite bed the calcium is retained in the bed and the sodium is transferred to solution in the water as sodium bicarbonate. It is also known to regenerate the "spent" zeolite bed after use by passing through the bed of calcium zeolite a solution of sodium chloride. The calcium zeolite may be thus reconverted into sodium zeolite by a reaction like that shown in the following equation:

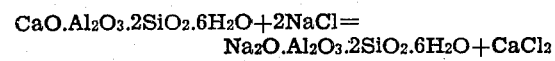

In carrying out the foregoing procedure for reducing the hardness of water, the sodium bicarbonate formed is not recovered from solution and this procedure has not heretofore been practicable for the production of a sodium salt from a calcium salt, for example, and the recovery as a commercial product of the thus formed sodium salt. The extremely high dilutions of the solutions obtained by passing a solution of calcium or magnesium salt through a bed of sodium zeolite, for example, have apparently precluded this procedure for the production of sodium salts.

It is an object of my invention to provide a process whereby a calcium or magnesium salt in a solution containing a relatively high content of the salt may be converted into the corresponding sodium, potassium or ammonium salt, which latter salt passes into solution, whereas the calcium radical is introduced into a relatively insoluble material from which the solution may be separated. The solution now containing sodium, potassium or ammonium salt in substantial concentrations may be treated for recovery of this salt. It is a further object of my invention to provide a process such as described, wherein the solid material containing the calcium or magnesium radicals exchanged for the sodium, potassium or ammonium radicals may be regenerated by replacing the calcium or magnesium with sodium, potassium or ammonium preparatory for use in converting additional calcium or magnesium salts into the corresponding sodium, potassium or ammonium salts. Still another object of my invention is to provide a process in which calcium nitrate, for example, in solution in water is converted into sodium, potassium and ammonium nitrate by passage of the calcium nitrate solution through a bed of zeolite and the nitrate content of the solution may be substantially completely recovered. This nitrate content of the solution is in part recovered in the form of solid sodium, potassium or ammonium nitrate by concentration of a portion of the solution passed through the bed of zeolite and in part is contained in solutions withdrawn from the zeolite bed and returned for enrichment in calcium or magnesium nitrate and again passed through the zeolite bed. Further objects of the invention will appear hereinafter.

In carrying out the process of this invention a solution containing a relatively high content of one or more soluble salts, such as calcium or magnesium salts, may be contacted with a body of a zeolite containing an exchangeable basic radical different from the basic radical of the salt in the solution, for example, a sodium, potassium or ammonium zeolite, i. e., a zeolite containing as an exchangeable basic radical one or more of the alkali radicals sodium, potassium or ammonium. The solution passed in contact with the body of zeolite should contain about 10% to 20%, and preferably about 16%, of dissolved salts principally consisting of calcium and/or magnesium nitrate. After contacting the solution and zeolite, thereby causing an exchange of calcium or magnesium radicals in the dissolved salt for sodium, potassium or ammonium, the solution now containing dissolved therein one or more salts of the latter radicals, is separated from the zeolite and may be treated for recovery of its salt content.

In carrying out the aforesaid steps of the process of this invention a bed of sodium zeolite within a vessel or container is submerged in water. The solution of calcium nitrate, for example, is then admitted to the vessel above the zeolite bed and the water is withdrawn from the bottom of the vessel, the flows of liquid being so regulated that a continuous body of liquid is maintained in contact with and moves downwardly through the zeolite bed as the calcium nitrate displaces the water from the bed. When the liquid leaving the vessel contains a desired proportion of salts, it is separately collected from the preceding portion of liquid and is concentrated to crystallize out sodium nitrate. As the calcium nitrate solution continues to be passed through the zeolite and more and more of the sodium zeolite is converted into calcium zeolite, the proportion of calcium nitrate converted into sodium nitrate by contact with the zeolite decreases. When the proportion of the total calcium nitrate passed through the bed converted to sodium nitrate is within the range of 50% to 60%, the flow of calcium nitrate solution to the zeolite bed is discontinued and water is admitted to the top of the vessel to displace the salt solution from the bed of zeolite and to wash soluble salts out of the zeolite. When the salt content of the liquid leaving the vessel falls below a desired minimum, the subsequent portions of liquid from the vessel are collected separate from the previous portions which were destined for concentration to recover sodium nitrate. The washing of the zeolite is continued until the exit water contains substantially no dissolved salts. The introduction of wash water to the bed is then discontinued and a solution of sodium chloride introduced into the top of the vessel and passed therethrough to convert the calcium zeolite into sodium zeolite. After regeneration of the sodium zeolite, water is again passed through the bed of zeolite to wash out chlorides remaining therein. When the liquid leaving the vessel containing the zeolite is substantially free of chloride ions, the bed of zeolite, submerged in water, is again utilized for the transformation of calcium nitrate to sodium nitrate by introducing to it calcium nitrate solution in the manner described above. The solutions containing chlorides formed in this regeneration of the zeolite bed may be discarded to waste, or if desired, treated in any desired manner to utilize their content of calcium and sodium chloride.

As noted above, that portion of the solution leaving the zeolite bed during the passage of calcium nitrate solution therethrough which contains a suitable concentration of sodium nitrate is concentrated for the recovery of solid sodium nitrate therefrom. Mother liquor from which sodium nitrate has been separated, together with the portions of liquor separately collected from the zeolite bed both before and after the passage of calcium nitrate solution therethrough, are employed in making up a calcium nitrate solution to be treated for conversion of the calcium nitrate into sodium nitrate. By thus utilizing the three solutions obtained in carrying out the process of this invention which contain appreciable quantities of nitrate salts, the process may be operated with substantially no loss of nitrate. The returned solutions of the process may be enriched in calcium nitrate by employing them for the absorption of nitrogen oxides to form a nitric acid solution which may then be neutralized with calcium hydroxide or calcium carbonate to form calcium nitrate. The process of this invention, therefore, is particularly suitable for the production of sodium, potassium or ammonium nitrate from gases containing oxides of nitrogen such as may be obtained by the oxidation of ammonia and from many other chemical processes. In enriching the liquors obtained in the process of this invention with calcium nitrate, if desired, a part of the nitrogen oxides may be absorbed in the neutral solutions to form nitric acid. A slurry of calcium hydroxide or calcium carbonate may be prepared with another portion of the neutral solution and the slurry employed for the final treatment of the nitrogen oxide gas to absorb the nitrogen oxide with the formation of calcium nitrate solution containing more or less calcium nitrite. By mixing the nitric acid solution and the solution containing calcium nitrite and neutralizing with calcium hydroxide or calcium carbonate, the calcium compounds may be converted into calcium nitrate and the solution of calcium nitrate thus prepared may be passed through a zeolite bed to convert the calcium nitrate into sodium, potassium or ammonium nitrate as described above.

Since the process of this invention is especially of value in the production of sodium nitrate, the invention is more particularly illustrated by the following description of a method for obtaining that salt, but it is not limited thereto. In this example the amounts of materials given in "parts" are in parts by weight.

The accompanying drawing illustrates diagrammatically one procedure of carrying out the process of this invention in converting calcium nitrate into sodium nitrate.

With reference to the drawing, a bed of zeolite contained in vessel 1 is employed for the treatment of a calcium nitrate solution. This zeolite may be a synthetic material substantially corresponding to the formula $Na_2O.Al_2O_3.3SiO_2.6H_2O$ and prepared: (a) dissolving 133 parts of commercial aluminum sulfate containing 17% soluble alumina in 2000 parts of water, diluting 620 parts of commercial water glass of 40° Bé., containing $Na_2O$ and $SiO_2$ in the weight ratio of 1 to 3.3, with 3000 parts water, and mixing these solutions; (b) adding to the final solution from (a) a solution of 160 parts of commercial sodium aluminate, containing 50% soluble alumina, in 2500 parts of water, thereby producing a gel; and (c) drying the gel from (b) at 100° C., crushing the dried material to form granules of a desired size, and washing the granules with water to remove soluble salts, chiefly sodium sulfate. The bed of zeolite thus prepared, is submerged in a body of water remaining from a preceding step of the process as described below. Calcium nitrate solution is admitted to the top of vessel 1 from a pipe 2 and flows downwardly through the bed of zeolite displacing the water from the bed. The liquid leaving the vessel through a pipe 3 is passed through a pipe 4 to a storage vessel 5. At first substantially pure water leaves the zeolite bed, but as the flow of calcium nitrate solution continues, nitrate appears in the solution from the bed. When the specific gravity of the solution leaving the zeolite bed and passing out through pipe 3 increases to about 1.042 due to the presence therein of nitrate, the solution is then passed through a pipe 6 to a storage vessel 7. After a desired amount of calcium nitrate has been introduced into the top of vessel 1, water is admitted to the vessel from a pipe 8 and, passing downwardly through the bed of zeolite, displaces the salt solution remaining in the bed and the amount of nitrate in the solution leaving the zeolite bed decreases with a resulting decrease in the specific gravity of the solution. When the specific gravity of the solution leaving through pipe 3 falls to about 1.042, the solution is diverted through pipe 4 to a storage tank 5 and water is continued to be introduced into vessel 1 until the specific gravity of the liquid leaving through pipe 3 falls to about 1.005, showing the substantial absence of dissolved salts therein. Sodium chloride solution is then admitted to vessel 1 from a pipe 9 and passed downwardly through the zeolite bed while the liquid leaving the bed through pipe 3 is withdrawn through a pipe 10 and discharged to waste. This salt solution may be sea water of the following approximate composition:

| | Grams per liter |
|---|---|
| NaCl | 28 |
| Calcium salts (calculated as Ca) | .96 |
| Magnesium salts (calculated as Mg) | 2.7 |

About 5120 parts by weight of this sea water is passed into vessel 1, following which water is again admitted and passed through the bed of zeolite until the liquid leaving through pipe 3 contains substantially no chloride ions. The introduction of water to vessel 1 is then discontinued and calcium nitrate solution again admitted from pipe 2 and solution withdrawn through pipes 3 and 4 as described above.

The solution from storage vessel 7 is passed into an evaporator 11 where it is concentrated to crystallize out solid sodium nitrate, which is recovered by a filter 12. The mother liquor after separation of the crystallized sodium nitrate is passed to storage vessel 5. The solution from storage vessel 5 is employed in an absorption tower 13 for the absorption of nitrogen oxides to form nitric acid solution which is passed to a vessel 14 where the acid is neutralized by addition of calcium carbonate and the resulting solution of calcium nitrate is passed to a storage vessel 15, whence it may be withdrawn for treatment to form sodium nitrate.

In carrying out the process described, the zeolite bed in vessel 1 may contain, for example, about 1000 parts of zeolite granules of 14 to 35 mesh size. The solutions obtained in various stages of the process may have the following compositions:

(a) Process heads (solution passed to vessel 5 when calcium nitrate solution is being first introduced into vessel 1)—

| | Parts |
|---|---|
| NaNO₃ | 4.1 |
| Ca(NO₃)₂ | 0.9 |
| Mg(NO₃)₂ | 0.7 |
| H₂O | 296 |

(b) Calcium nitrate solution introduced into the zeolite bed from pipe 2—

| | Parts |
|---|---|
| NaNO₃ | 14.8 |
| Ca(NO₃)₂ | 96.6 |
| Mg(NO₃)₂ | 22.1 |
| H₂O | 700 |

(c) Solution withdrawn through pipes 3 and 6 to storage vessel 7—

| | Parts |
|---|---|
| NaNO₃ | 59 |
| Ca(NO₃)₂ | 42 |
| Mg(NO₃)₂ | 20.2 |
| H₂O | 887 |

(d) Process tails (liquid withdrawn through pipes 3 and 4 to vessel 5 after withdrawal of solution to vessel 7)—

| | Parts |
|---|---|
| NaNO₃ | 4.8 |
| Ca(NO₃)₂ | 2.1 |
| Mg(NO₃)₂ | 1.2 |
| H₂O | 375 |

The solution of calcium nitrate treated in accordance with the foregoing process contains about 14.2% calcium and magnesium nitrates and a total salt content of about 16%. The use of solutions of about this concentration in obtaining sodium, potassium or ammonium nitrates by base exchange with a zeolite is particularly advantageous from two aspects. First, by employing solutions of about this concentration (about 10% to 20%), a minimum amount of water must be evaporated from the process liquors to recover the sodium nitrate as determined by the base exchange capacity of the zeolite bed, the amount of wash water required for washing salts out of the zeolite bed, and the amount of water which may be returned in making up the calcium nitrate solution. Furthermore, in order to prepare a solution of calcium nitrate of the above concentration, the absorption of nitrogen oxides to form nitric acid may be carried out to obtain a relatively dilute nitric acid (below about 15.4% HNO₃). Since the efficiency with which nitrogen oxides are absorbed in a liquid decreases as the acidity of the liquid increases, by requiring the preparation of acid solutions of relatively low acidity the process of this invention permits of the economic absorption of nitrogen oxides from gases containing the same.

Any zeolite containing an exchangeable sodium radical may be used in the above process for converting calcium nitrate into sodium nitrate. Thus, among others, zeolites having the general formulas Na₂O.Al₂O₃.2SiO₂.6H₂O, Na₂O.2Al₂O₃.5SiO₂.xH₂O or Na₂O.Al₂O₃.2SiO₂.xH₂O may be employed for the production of sodium nitrate. The reactions taking place in converting calcium nitrate to sodium nitrate and in regenerating the zeolite bed may be expressed by the following equations in which the composition of the zeolite other than the replaceable sodium radical is expressed by the formula Ze:

Ca(NO₃)₂+Na₂Ze=2NaNO₃+CaZe

CaZe+2NaCl=Na₂Ze+CaCl₂

While the process of this invention has been particularly described in connection with a method for the conversion of calcium nitrate into sodium nitrate, it may be employed for the production of potassium or ammonium nitrate from calcium or magnesium nitrate by using a bed of a potassium or ammonium zeolite for the treatment of solutions of the latter salts. The solution separated from the zeolite and containing potassium or ammonium nitrate may then be concentrated and the potassium or ammonium nitrate recovered by crystallization. Again, by employing a bed of a mixture of zeolites in which sodium and potassium, sodium and ammonium, potassium and ammonium or all three sodium, potassium and ammonium radicals are replaceable, solutions containing two or more of the nitrates of sodium, potassium or ammonium, from which mixed solids containing these salts may be recovered, may be prepared in accordance with the process of this invention. In preparing such mixtures the regeneration of the zeolite bed may be carried out employing solutions containing two or more salts of sodium, potassium and ammonium.

The calcium or magnesium nitrate solutions employed in my process may contain substances other than salts of these basic radicals. Furthermore, the solutions may contain salts of acids other than the nitrates. Thus, for example, phosphate rock may be decomposed with nitric acid and the solution thus obtained, after adjustment of its acidity and containing soluble salts of calcium and/or magnesium and of nitric and phosphoric acids, may be contacted with a bed of sodium zeolite, potassium zeolite or ammonium zeolite or with a bed containing two or more of these zeolites, to replace the calcium in the solutions by the exchangeable sodium, potassium or amonium radical of the zeolite bed. The resulting solution may be treated for recovery therefrom of a solid material containing a mixture of salts particularly suitable for use as a fertilizer. By suitable proportioning of the amounts of sodium, potassium and ammonium exchanged for the calcium and magnesium of the solution, fertilizers of various desirable compositions may be obtained.

I claim:

1. The process for the production of sodium nitrate which comprises displacing from a bed of sodium zeolite a body of water submerging said zeolite bed by introducing to the top of said bed and passing therethrough a solution of calcium nitrate containing about 10% to 20% of nitrate salts, discontinuing the introduction of said solution to said bed of zeolite when the proportion of calcium nitrate in the solution converted into sodium nitrate is about 50% to 60%, then displacing from said bed of zeolite said solution of nitrate salts by introducing water to the top of said bed and passing the water downwardly therethrough, separately collecting that portion of the solutions from said zeolite bed which has a specific gravity above about 1.042 from the portion of said solutions having a specific gravity below about 1.042, concentrating the first mentioned portion of solutions from the zeolite bed to recover sodium nitrate therefrom, enriching the second mentioned portion of solutions from the zeolite bed in calcium nitrate to form a solution containing about 10% to 20% of dissolved salts and treating this solution for the production of sodium nitrate in the manner described for the treatment of the aforesaid solution of calcium nitrate containing about 10% to 20% dissolved salts.

2. A process for the production of a nitrate which comprises absorbing nitrogen oxides in an aqueous liquor to form a dilute nitric acid solution containing below about 15.4% $HNO_3$, neutralizing said acid solution with a basic compound of calcium or magnesium to form a solution of calcium or magnesium nitrate containing about 10% to 20% of salts dissolved therein, contacting said solution of calcium or magnesium nitrate with a zeolite containing an exchangeable basic radical from the group consisting of sodium, potassium and ammonium, and evaporating the thus treated solution to crystallize out a nitrate of the group sodium, potassium and ammonium nitrates.

3. The process for the production of a nitrate which comprises displacing from a bed of a zeolite containing an exchangeable basic radical from the group consisting of sodium, potassium and ammonium, a body of water submerging said zeolite bed by introducing to the top of and passing downwardly through said bed a solution of a nitrate of a metal from the group consisting of calcium and magnesium containing about 10% to 20% of dissolved salts, then displacing from said bed of zeolite said salt solution by introducing water to the top of said bed and passing the water downwardly through said bed, concentrating the portion of the solutions thus obtained containing substantial proportions of nitrate salts to crystallize therefrom a nitrate salt from the group consisting of the nitrates of sodium, potassium and ammonium, separating the crystallized nitrate from the mother liquor, separately collecting the remaining portions of the aforesaid solutions which contain small amounts of nitrate salts, mixing these portions of the solutions with said mother liquor, absorbing nitrogen oxides in the mixture to form a dilute nitric acid solution containing below about 15.4% $HNO_3$, neutralizing the nitric acid solution with a basic compound of calcium or magnesium to form a solution containing 10% to 20% of dissolved salts and treating this solution for the production of nitrate in the manner described for treating the aforesaid solution containing 10% to 20% dissolved salts.

4. The process for the production of sodium nitrate which comprises (1) displacing from a bed of sodium zeolite a body of water submerging said bed by passing an aqueous solution containing up to about 20% each of calcium nitrate and magnesium nitrate and a total of 10% to 20% of calcium and magnesium nitrates downwardly in one direction through said bed, discontinuing the passage of said solution when the proportion of total calcium and magnesium nitrates in the solution passed through the bed converted into sodium nitrate is about 50% to 60%, (2) displacing the solution of calcium and magnesium nitrates from the zeolite bed by passing water downwardly in the same direction therethrough; and in steps (1) and (2) maintaining the bed of zeolite submerged in the aqueous liquids, separately collecting that portion of the solutions from said zeolite bed which has a specific gravity of above about 1.042, recovering sodium nitrate from said portion by concentration and crystallization, passing a solution of sodium chloride downwardly through the bed of zeolite to regenerate the sodium zeolite, washing chloride from said bed with water and when the bed has been substantially freed of chloride leaving the bed submerged in water, and utilizing said bed for the production of sodium nitrate in accordance with the aforesaid process.

5. A process for the production by means of base exchanging zeolite of a solution of a nitrate suitable for concentration to crystallize said nitrate therefrom, characterized by the following liquids being passed in the same direction in successive contact with one another and in the following order through a base exchanging substance containing the cation of the desired nitrate: first, a separating body of water substantially free from impurities which would contaminate the nitrate produced; secondly, a solution containing about 10% to about 20% of a nitrate of the group consisting of calcium nitrate and magnesium nitrate; thirdly, a separating body of water substantially free from impurities which would contaminate the nitrates formed; and fourthly, a regenerating salt solution having a cation selected from the group consisting of sodium, potassium and ammonium and an anion capable of forming a soluble salt with the exchangeable base of the zeolite, and separating that part of the resulting nitrate solution and adjacent separating water which contains substantial amounts of nitrates from the solution formed by passage through said base exchanging zeolite of said solution having a cation selected from the group consisting of sodium, potassium and ammonium and an anion capable of forming a soluble salt with the exchangeable base of the zeolite and the separating water adjacent thereto which is substantially free from nitrates, said process being repeated without the sequence of steps enumerated hereinabove being changed, and with the zeolite being at all times submerged in liquid so that it is not exposed to the air.

6. A process as in claim 5 in which the nitrate solution which is first passed through the zeolite contains initially both calcium and magnesium nitrates and has a total salt concentration of about 10% to 20%.

7. The process for the production of a nitrate which comprises displacing from a bed of a zeolite containing an exchangeable basic radical from the group consisting of sodium, potassium and ammonium, a body of water submerging said zeolite bed by introducing to the top of and passing downwardly through said bed a solution of a nitrate of a metal from the group consisting of calcium and magnesium containing about 10% to 20% of dissolved nitrate salt, then displacing from said bed of zeolite said salt solution by introducing water to the top of said bed and passing the water downwardly through said bed, while carrying out the aforedescribed steps maintaining said zeolite bed submerged in the liquids successively passed therethrough, and collecting the solution leaving said bed which contains nitrate salt separately from liquid substantially free from nitrate which flows out of the bed ahead of and behind the nitrate solution.

DWIGHT C. BARDWELL.